May 20, 1930.  H. D. GEYER  1,759,449
SPRING SHACKLE
Filed Dec. 20, 1926   2 Sheets-Sheet 1

Inventor
Harvey D. Geyer
By Sperver Hardman & Felr
his Attorneys

May 20, 1930.　　　H. D. GEYER　　　1,759,449
SPRING SHACKLE
Filed Dec. 20, 1926　　2 Sheets-Sheet 2

Inventor
Harvey D. Geyer
By Spencer Hardman & Fehr
his Attorneys

Patented May 20, 1930

1,759,449

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

SPRING SHACKLE

Application filed December 20, 1926. Serial No. 155,801.

This invention relates to non-metallic elastic connections for connecting the end of a cantilever spring to the stationary axle of a motor vehicle.

An object of the invention is to provide an improved type of suspension of the rear end of a cantilever spring to the rear axle housing or stationary rear axle.

Further objects and advantages of the present invention will be apparent from the following description, reference being had to the accompanying drawings, wherein a preferred embodiment of one form of the present invention is clearly shown.

In the drawings.

Similar reference characters refer to similar parts through the drawings.

Figures 4, 5:
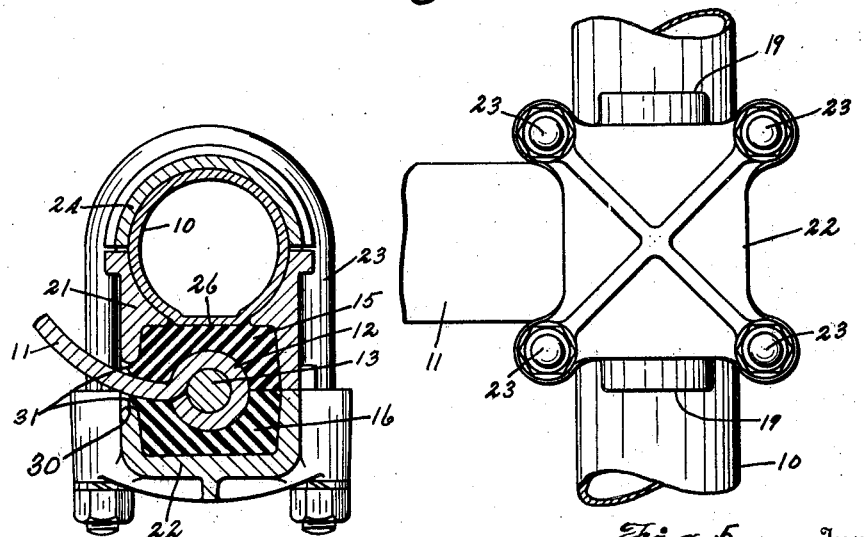
Fig. 4 is a transverse section taken on line 4—4 of Fig. 3.
Fig. 5 is a bottom view of the connection.

Numeral 10 designates the conventional stationary tubular rear axle which houses the live axle (not shown). The long leaf 11 of the cantilever spring 9 extends rearwardly over and beyond the rear axle 10 and is curved downwardly around axle 10 and terminates in a spring eye 12 which lies adjacent the underside of axle 10, as clearly shown in Fig. 4. A transverse bar 13 having ends 14 projecting beyond the sides of the spring leaf 11 is rigidly fixed in eye 12. The spring eye 12 and bar 13 are completely enclosed by the elastic rubber blocks 15 and 16 which are held encased by and compressed by a metal housing designated as a whole by numeral 20. Housing 20 is made in two parts divided approximately on the center line of spring eye 12, the upper part 21 abutting and conforming to the shape of the axle 10 as clearly shown in Fig. 4. The lower part 22 of the housing is rigidly clamped up against the upper part 21 and both parts are rigidly clamped to axle 10 by the two U-bolts 23 which extend through bosses provided on the four corners of the lower part 22. A seating member 24 having seating grooves 25 therein for the U-bolts 23 is preferably provided on top of the axle 10. The under side of axle 10 is preferably flattened for the length of the abutting housing member 21, as shown at 26 in Fig. 4, so that when the nuts of U-bolts 23 are drawn up tight the housing 20 will be held positively against rotation relative to axle 10. In other words, the flattened portion 26 of axle 10 acts as a key for holding the housing 20 against relative rotation thereupon. Of course other and well known means may be suitably provided for rigidly fixing the housing 20 to the axle 10, if desired.

The upper and lower housing parts 21 and 22 are cut away to provide an elongated transverse slot 30 through which the spring leaf 11 extends. This slot 30 has only sufficient vertical depth to at all times clear the leaf 11 during the slight pivoting of the spring eye 12 within the elastic rubber blocks 15 and 16. Slot 30 also clears the lateral edges of leaf 11 by a sufficient amount to insure that there will be no metal-to-metal contact between leaf 11 and housing 20 when in use. It is therefore seen that the clearance areas of slot 30 around the spring leaf 11 will be so small that the elastic rubber 15 and 16 will bulge outward, due to the compression under which it is confined by housing 20, only a small amount, somewhat as shown at 31 in Fig. 4. These outward bulges 31, however, prevent dirt, mud, etc. from entering the housing 20 around the leaf 11.

Figure 1:
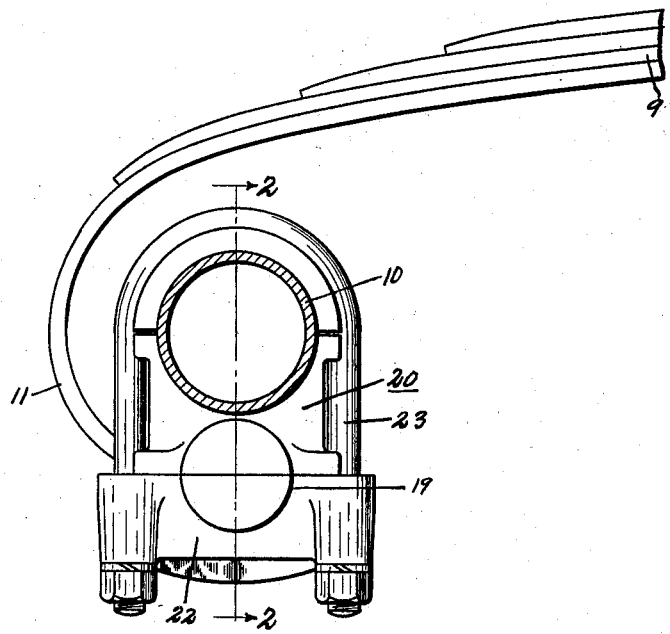
Fig. 1 is a side elevation of the rear end of an automobile cantilever spring connected to the stationary rear axle according to this invention.
Figure 2:
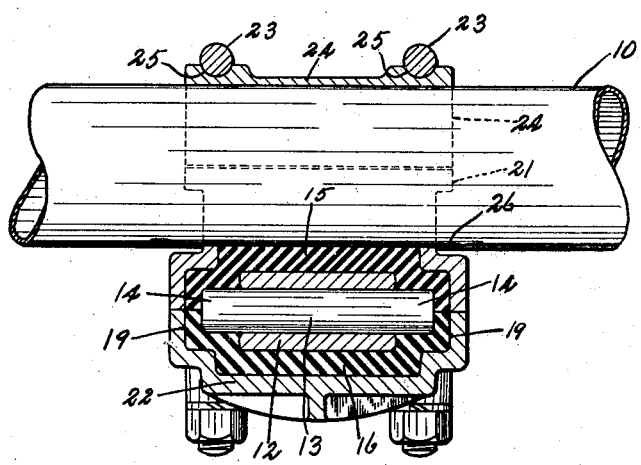
Fig. 2 is a sectional view through the connection taken on line 2—2 of Fig. 1.
Figure 3:
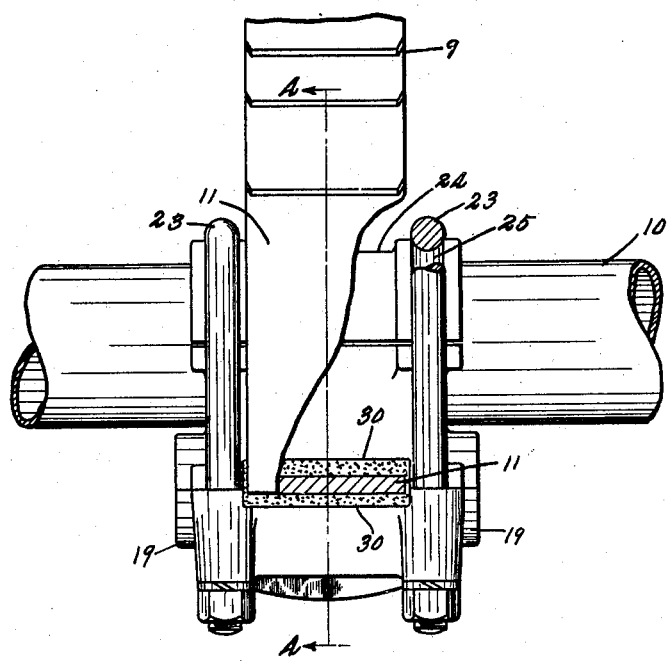
Fig. 3 is a rear end elevation with a portion of the spring leaf broken away to more clearly show the clearance between the spring leaf and the slot in the metal housing through which it passes.

In operation, the axle 10 is guided in its up-and-down movement relative to the chassis frame by the well known torque tube through which the driving thrust from the rear wheels is transmitted to the chassis frame. The well known present day Buick automobile is cited as an example of this construction. Now when the cantilever springs 9 are deflected or flattened out under load, the end of spring leaf 11 is held pivoted at a substantially longitudinally fixed point relative to the chassis frame and hence the downwardly sweeping curve of leaf 11 will be flexed to a sharper curve to permit said flattening of spring 9. During such flexing the spring eye 12 and bearing member 13 fixed thereto pivot within the elastic rubber 15 and 16 by internal distortion of the rubber, the rubber being held in tight non-slipping relation with all its contacting metal surfaces by the compression under which it is confined by housing 20. The tendency of the end of leaf 11 to pull out of the housing 20 is chiefly resisted by the lateral projections 14 of bar 13 which extend laterally beyond the slot 30 in housing 20. These projections 14 project into circular recesses 19 of the housing 20 and are isolated therefrom by portions of the elastic rubber blocks 15 and 16, as clearly illustrated in Fig. 2. From this illustration it is obvious that the end of spring leaf 11 is positively held within the housing 20 but is completely isolated therefrom by the elastic rubber and permitted a pivotal movement therein by elastic distortion of the rubber. The variation of curvature of the downwardly curved end of leaf 11 during deflection of the spring 9, as described above, causes the end of the spring leaf 11 to pivot through small angles within the elastic rubber block. Since there is no relative sliding of metal upon metal this spring connection is noiseless and will require no lubrication. Also the spring is completely isolated by elastic rubber from the axle 10 and hence no rumble is transmitted from the axle 10 to the chassis frame.

While the form of embodiment of the present invention as herein disclosed, constitutes a preferred form, it is to be understood that other forms might be adopted, all coming within the scope of the claims which follow.

What is claimed is as follows:

1. In combination with a cantilever spring, and stationary axle of a motor vehicle, a shackle interconnecting the spring end with said axle, comprising: a transverse metal bar of greater length than the width of the spring end and rigidly fixed to said spring end, an elastic rubber block surrounding said spring end and bar, and a metal housing supported by said axle and confining said rubber block under compression and having an opening therein of sufficient dimensions to clear the spring where it passes therethrough whereby said spring end may pivot within said housing by internal distortion of the elastic rubber block.

2. In combination with a cantilever spring and stationary axle of a motor vehicle, a shackle interconnecting the spring end with said axle, comprising: a transverse metal bar of greater length than the width of the spring end and rigidly fixed to said spring end, an elastic rubber block surrounding said spring end and bar, and a metal housing supported by and depending below said axle and confining said rubber block under compression, said housing having a transverse elongated opening permitting the passage of the spring thereinto without metal-to-metal contact between said spring and housing when the spring end pivots within said elastic rubber block.

3. In combination with a cantilever spring and stationary axle of a motor vehicle, a shackle interconnecting the spring end with said axle, comprising: a transverse metal bar of greater length than the width of the spring end and rigidly fixed to said spring end, an elastic rubber block surrounding said spring end and bar, and a metal housing rigidly fixed to and depending below said axle and confining said rubber block under compression, said housing having a transverse elongated opening permitting the passage of the spring thereinto without metal-to-metal contact therewith.

4. In a motor vehicle, in combination, a stationary axle, a cantilever leaf spring having the long leaf thereof curved downwardly around said axle and terminating below said axle, a shackle interconnecting the spring end to said axle comprising: a bearing member rigidly fixed to the spring end and extending laterally beyond the edges thereof, an elastic rubber block surrounding and isolating said spring end and bearing member, and a metal housing depending from said axle and confining said rubber block under compression, but having an elongated opening permitting the passage of the spring leaf thereinto, whereby said spring end is pivotally connected to said axle, but completely isolated by elastic rubber therefrom.

5. In a motor vehicle, in combination, a stationary axle, a cantilever leaf spring having the long leaf thereof curved downwardly around said axle and terminating below said axle, a shackle interconnecting the spring end to said axle comprising: a bearing member rigidly fixed to the spring end and extending laterally beyond the edges thereof, an elastic rubber block surrounding and isolating said spring end and bearing member, and a metal housing rigidly fixed to the under-side of said axle and confining said rubber block under compression, said housing having an opening permitting the passage of the spring leaf thereinto, said opening being of less lateral width than said bearing member.

6. In a motor vehicle, in combination, a stationary axle, a cantilever leaf spring having its long leaf curved downwardly around the axle and terminating below the under-side thereof, an elastic rubber block surrounding and isolating the spring end, and a metal housing depending from and supported by said axle and confining said rubber block under compression, said housing having an elongated transverse opening permitting the passage of the spring leaf thereinto.

7. In a motor vehicle, in combination, a stationary axle, a cantilever leaf spring having its long leaf curved downwardly around the axle and terminating in an enlarged end adjacent the under-side thereof, an elastic rubber block surrounding and isolating the spring end, and a metal housing rigidly fixed to and depending from said axle and confining said rubber block under compression, said housing having an opening therein of sufficient dimensions to clear the spring leaf where it passes into the housing.

In testimony whereof I hereto affix my signature.

HARVEY D. GEYER.